Figure 1:
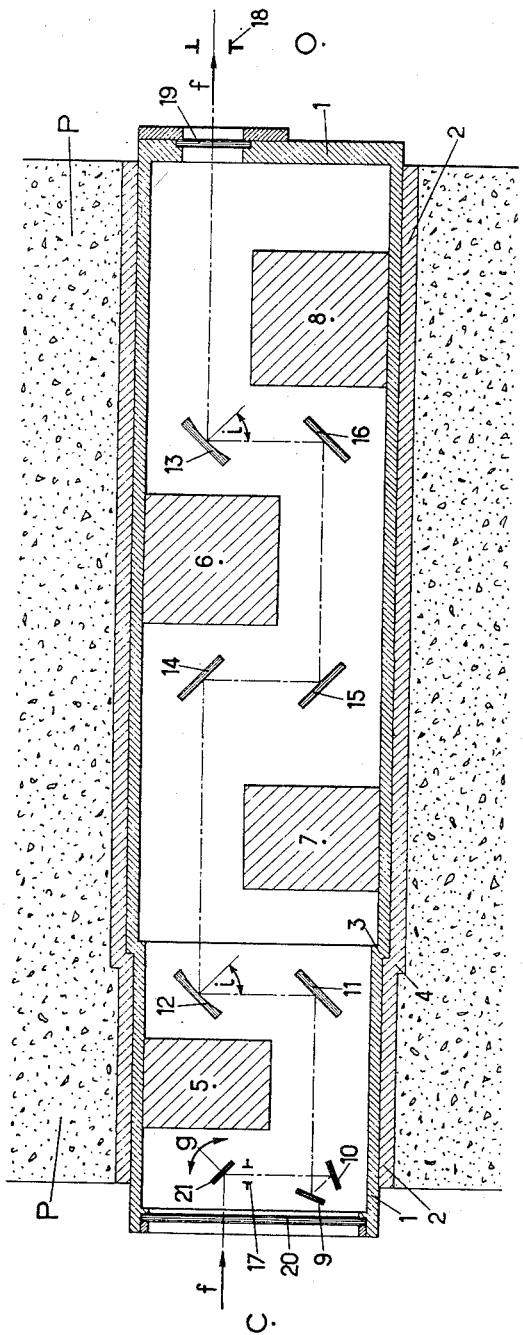

July 3, 1962

S. CLAVÉ ET AL 3,041,916

AFOCAL OPTICAL DEVICE HAVING A MOUNTING
PROVIDING PROTECTION AGAINST
DANGEROUS RADIATION

Filed March 11, 1960

3 Sheets-Sheet 1

INVENTORS
Serge Clavé
Marcel Clave

By Holcomb, Wetherill & Brisebois
ATTORNEYS

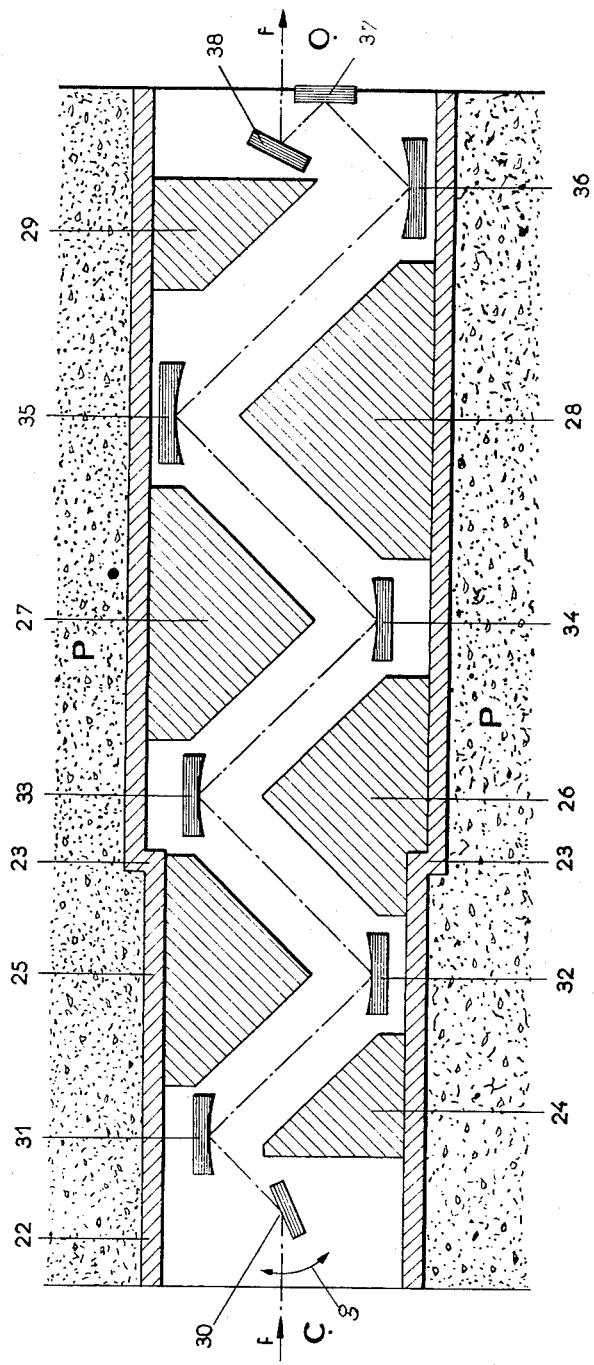

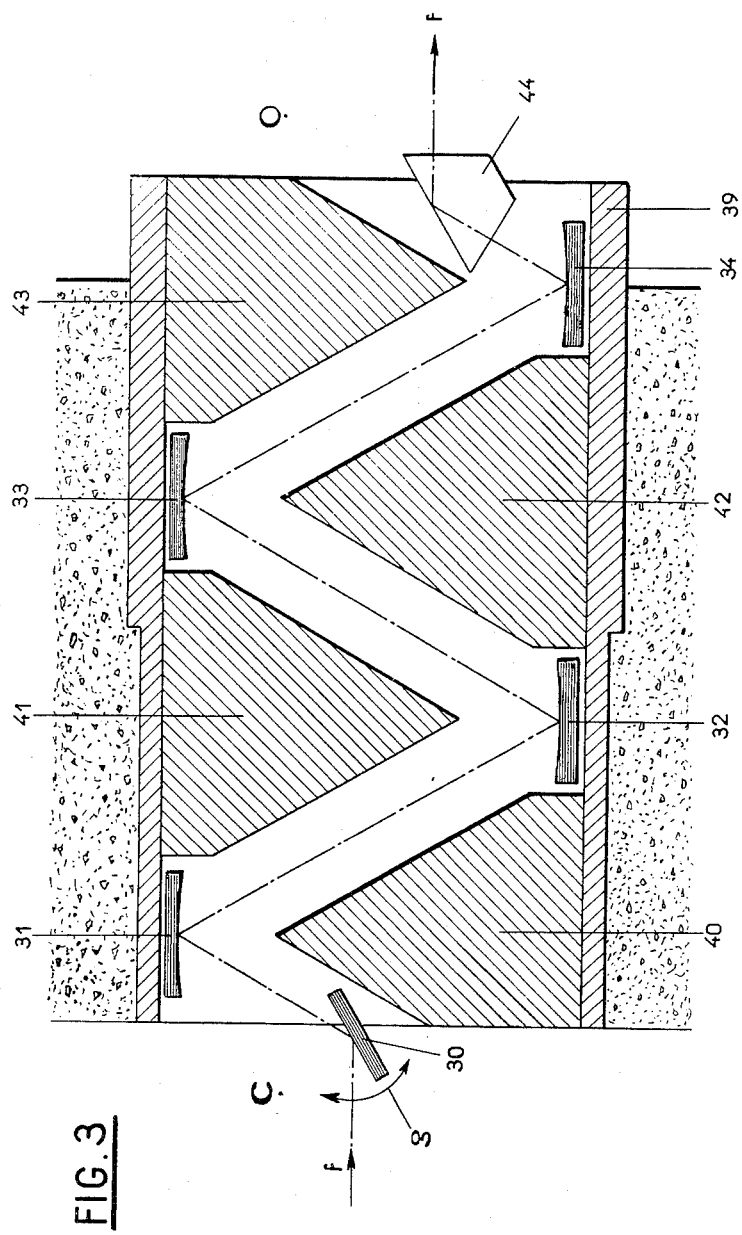

United States Patent Office 3,041,916
Patented July 3, 1962

3,041,916
AFOCAL OPTICAL DEVICE HAVING A MOUNTING PROVIDING PROTECTION AGAINST DANGEROUS RADIATION
Serge Clavé and Marcel Clavé, both of 9 Rue Olivier-Metra, Paris, France
Filed Mar. 11, 1960, Ser. No. 14,330
Claims priority, application France Mar. 13, 1959
6 Claims. (Cl. 88—1)

When it is desired to observe phenomena taking place within an enclosure from which dangerous radiation is being emitted, it is necessary to utilize optical devices provided with mountings incorporating protective screens. The mountings for such optical devices heretofore used afford effective protection, but comprise optical elements which are not protected against radiation, and which consequently rapidly become opaque, thus rendering the device momentarily useless and necessitating its repair.

This defect may be partially remedied by using special glasses, but these are more or less dark, so as to generally afford only mediocre visibility through the instrument.

The object of the present invention is to provide an afocal optical device which remedies these deficiencies while insuring the protection of the observer against dangerous radiation. This optical device is characterized by the fact that it comprises in combination the following elements: a tubular mounting of a generally rectangular prismatic form, made of any suitable material, positioned in the wall separating the zone to be observed from the zone of the observer, this tubular mounting comprising screens projecting alternately from two opposing surfaces of the mounting so as to leave a zig-zag passageway therebetween; a set comprising an even number of cylindrical mirrors of the same focal length, and a set of plane mirrors cooperating with these cylindrical mirrors to direct the beam of light around the turns in this passageway along the center of the zig-zag line, the successive cylindrical mirrors being spaced along the path of the beam by a distance 2T, substantially equal to R cos $i$, where R designates a radius and $i$ designates the angle of incidence which is the same on all the mirrors; a set of plane mirrors, one of which is angularly adjustable, which cooperate to direct the entering beam to the mirror positioned at the entrance to the first turn; and an optical device mounted to receive the beam leaving the last turn and direct it toward the observer.

In a first embodiment of the invention, the afocal optical device comprises two cylindrical mirrors positioned at the end of a zig-zag passage comprising a succession of right angles, and an odd number of intermediate plane mirrors placed at the turns in this passage.

In a second embodiment the device according to the invention is provided with walls which leave a saw-tooth passage which is symmetrical about the longitudinal axis of the mounting and comprises a cylindrical mirror at each turn in this passage, the reflecting surfaces of the mirrors being substantially parallel to the adjacent longitudinal walls of the mounting. The optical device according to the invention possesses the following advantages.

The observer and the apparatus positioned on the observer's side are completely protected against dangerous radiation.

The elements constituting the optical combination comprise only mirrors having metallized surfaces, insensitive to the radiation emitted by nuclear phenomena, regardless of their position in the mounting.

The time during which it may be used is unlimited; it may be left in continuous service, without adversely affecting the visibility therethrough.

It is smaller than comparable known devices.

In order to seal the apparatus according to the invention, it may be provided with a closure or cover on the observer's side.

Three possible embodiments of the invention will now be described, purely by way of example. This description which refers to the accompanying schematic drawings, brings out additional particulars and advantages of the invention.

On the drawings:
FIGURE 1 is a cross-section taken through the longitudinal axis of a first embodiment of the invention.
FIGURE 2 is a cross-section taken through the longitudinal axis of a second embodiment of the invention.
FIGURE 3 is a cross-section taken through the longitudinal axis of a third embodiment of the invention.

The embodiment illustrated in FIG. 1 is seated in a wall P, of concrete, for example, which separates a contaminated enclosure C from an observation post O.

This device comprises a mounting 1 made of a material capable of stopping the radiation from the enclosure C. This mounting 1 is seated in a protective casing 2, of like material, which is embedded in the wall P. The mounting 1 and its casing 2 are provided with shoulders 3 and 4 which cooperate to insure the complete stoppage of the radiation from the enclosure C toward the observation post O, at all points about the periphery of the device.

The interior of the mounting 1 carries screens 5 and 6 in its upper part and screens 7 and 8 staggered with respect to screens 5 and 6, in its lower part.

Reference numerals 21, 9, 10 and 11 designate a set of plane mirrors positioned in the mounting 1 and cooperating to direct the beam of light along the line indicated by the arrow $f$, and proceeding from an object to be observed within the enclosure C, toward a cylindrical mirror 12 also positioned within the mounting 1.

The cylindrical mirror 12 reflects the beam of light which it has received toward a second cylindrical mirror 13 of the same focal length, by means of intermediate plane mirrors 14, 15 and 16. The plane mirrors 14, 15 and 16 and the cylindrical mirror 13 may be positioned in any suitable manner within the mounting 1.

The angles of incidence $i$ of the beam of light on the mirrors 12 and 13 are identical and in the case illustrated are equal to 45°. It will be seen that a beam of light following the line $f$ is deflected to pass successively around the screens 5, 7, 6 and 8. The distance travelled by the light beam between the mirrors 12 and 13 is $2T=R \cos i$, where R designates the radius of the mirrors 12 and 13, adapted to focus on a distant point, practically at infinity.

The device described comprises windows 17 and 18 respectively, through which the light beams enter and leave. These windows are positioned at a distance T from the nearest cylindrical mirror, T being equal to $$\frac{R}{2} \cos i$$

the symbols R, T and $i$ having the same meaning as heretofore.

The mirrors 12 and 13 may be mounted so as to modify their previously described spacing 2T in such a manner as to permit closer objects, not situated at infinity, to be brought into focus.

The optical device described also comprises a door 19 for closing it at the observer's end O. It is also possible to close it on the contaminated end C by means of a door 20, if that is considered necessary. In this case means is provided for heating the door 20 so that it will not become opaque as a result of the radiation. It has not been considered necessary to illustrate such heating means.

It should be noted that the optical device which has been described may be rendered panoramic in a vertical direction by making the innermost mirror 21 movable about a horizontal axis as indicated by the double arrow $g$, or in a horizontal direction by providing a pivotal mounting for the mirror assembly about a vertical axis. These two movements may be made concomitant by any suitable mechanical means and may be remotely controlled, if desired.

The device illustrated on FIG. 2 comprises a tubular mounting 22 which is rectangular in cross-section and made of a material, such as concrete, capable of stopping dangerous radiation from the enclosure C, which is separated by a wall P from an observation post O. The mounting 22 may be permanently mounted in the wall P or held in this wall by means of a casing made of a suitable metal or like material, in which casing the device may be slidably mounted so as to be removable.

The mounting 22 has a shoulder 23 between a portion of smaller diameter closer to the enclosure C and a portion of larger diameter extending toward the observation post O.

On two of its opposite walls the mounting 22 carries screens 24, 25, 26, 27, 28 and 29 made of any suitable material capable of blocking off the dangerous radiation which comes from the enclosure C.

The screens 24–29 leave between them a sawtooth passage, the sides of which are symmetrically positioned at angles of 45° with respect to the principal axis of the mounting 22.

Reference numeral 30 indicates a plane mirror positioned in the opening of the mounting 22 near the enclosure C, and reference numerals 31, 32, 33, 34, 35 and 36 a series of cylindrical mirrors which successively receive and reflect the beam of light falling in the direction indicated by the arrow $f$ to the plane mirror 30, from which it is reflected to the first cylindrical mirror 31. Two plane mirrors 37 and 38 are positioned at the observer's end of the mounting 22 after the last cylindrical mirror 36 and behind the screen 29 so as to redirect the image into the direction of observation along the direction of the arrow $f$, for example. The median path travelled by the beam of light between the entering and leaving arrows $f$ is marked in broken lines and has a sawtooth shape, as shown on the diagram.

The mirror 30 is so mounted that it may swing in the opposite directions indicated by the double arrow $g$.

If R and R' designate the radii of curvature of two cylindrical mirrors facing each other and $i$ the common angel of incidence of the beams of light which strike these mirrors, the space between these mirrors measured along the path marked in broken lines will be equal to $$\frac{R+R'}{2} \cos i$$

When $R=R'$, this distance will then be $R \cos i$. In the present case, where $i=45°$, the spacing of the two cylindrical mirrors which face each other will be equal to R cos 45° (the case of FIG. 1).

The afocal device shown on FIG. 3 is similar to the one described with reference to FIG. 2. It differs therefrom principally in that the interior of its mounting 39 comprises only four cylindrical mirrors 31, 32, 33, 34 and that the passages between the screens 40, 41, 42, 43 are inclined at 30° to the planes of symmetry of the cylindrical mirrors, that is at 60° to the upper and lower walls (as shown in FIG. 3) of the mounting 39. The mirror 30, as before, receives the beam of light following the line of the arrow $f$, and leaving the contaminated zone C. A totally reflecting prism 44 reflects the beam of light in the direction of the arrow $f$ toward the observer or toward an adjacent instrument in the zone O at the right of FIG. 3.

It will be seen that by adopting a suitable opening for the dihedral angle formed by the screens of one of the devices according to FIGS. 2 and 3, the invention may be readily adapted to each particular case.

Experience has shown that the devices described with reference to FIGS. 2 and 3 permit a wider field of observation to be obtained and offer better protection than the device illustrated in FIG. 1. While it has not been considered necessary to illustrate them, the devices of FIGS. 2 and 3 are generally provided with diaphragms adapted to form real or virtual pupils at the points where the beams of light enter and leave the device, these pupils being positioned at a distance from the nearest cylindrical mirror equal to $$T=\frac{R}{2} \cos i$$

T, R and $i$ having the significance previously pointed out.

It is of course within the scope of a man skilled in the art, when provided with the foregoing description, to modify the specific embodiments described as to details without thereby departing from the spirit of the invention. Moreover, afocal devices according to the invention may be used alone, or in conjunction with means for recording images or radiation, such as binoculars, goggles, electronic recorders, photo-electric cells, etc.

It is also within the scope of a man skilled in the art to join to the devices described any suitable focussing devices, especially for regulating the path of the beam of light between the two cylindrical mirrors.

What is claimed is:

1. An afocal optical device having a mounting adapted to protect an observer's zone against dangerous radiation emanating from a source thereof separated from said zone by a radiation-proof wall, said mounting comprising a tube extending through said wall and provided with a plurality of radiation blocking screens extending part way across said tube, alternate screens being attached to opposite sides of said tube to provide a zig-zag passage therebetween, an even number of cylindrical mirrors and a set of plane mirrors cooperating with the cylindrical mirrors to direct an entering beam of light around the turns of this passage, consecutive cylindrical mirrors being axially spaced by a distance substantially equal to ½ $(R_1+R_2) \cos i$, where $R_1$ and $R_2$ indicate the radii of curvature of said cylindrical mirrors and $i$ indicates the angle of incidence of at least one of said plane mirrors being located at the end of said device nearest said radiation source and being pivotally mounted to permit a selection of the beams of light to be reflected by it onto the next mirror.

2. Device as claimed in claim 1 comprising a single pair of cylindrical mirrors having the same radius and separated by an odd number of at least three plane mirrors.

3. Device as claimed in claim 2 in which the mirrors are inclined at an angle of 45° to the longitudinal axis of the tube and in which the medium path followed by the light rays between the protective screens consists of alternating axial and transverse segments.

4. Device as claimed in claim 1 in which the median path of travel of a light ray between said screens is sawtoothed with the segments thereof inclined with respect to the longitudinal axis of the tube, in which cylindrical mirrors are positioned at each angle of said path of travel with their summits of curvature lying in planes parallel to said longitudinal axis, each successive pair of mirrors having their focal planes in coincidence, and in which reflective means at the observer's end of said device reflects an emerging light ray into a path parallel to said longitudinal axis.

5. Device as claimed in claim 4 in which there is an odd number of pairs of cylindrical mirrors and said reflective means at the observer's end is an even number of plane mirrors.

6. Device as claimed in claim 4 in which there is an even number of pairs of cylindrical mirrors; and said reflective means at the observer's end is a prism.

References Cited in the file of this patent
UNITED STATES PATENTS

| | | |
|---|---|---|
| 1,581,659 | Roach | Apr. 20, 1926 |
| 2,594,970 | Monk | Apr. 29, 1952 |
| 2,763,177 | Taylor | Sept. 18, 1956 |

FOREIGN PATENTS

| | | |
|---|---|---|
| 108,315 | Great Britain | Jan. 24, 1918 |